United States Patent
Hollifield et al.

(10) Patent No.: US 9,558,230 B2
(45) Date of Patent: *Jan. 31, 2017

(54) DATA QUALITY ASSESSMENT

(71) Applicant: International Business Machines Corporation, Armonk, NY (US)

(72) Inventors: Thomas Hollifield, Austin, TX (US); Yannick Saillet, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 347 days.

This patent is subject to a terminal disclaimer.

(21) Appl. No.: 13/764,880

(22) Filed: Feb. 12, 2013

(65) Prior Publication Data
US 2014/0229456 A1 Aug. 14, 2014

(51) Int. Cl.
*G06F 17/30* (2006.01)

(52) U.S. Cl.
CPC ... *G06F 17/30371* (2013.01); *G06F 17/30303* (2013.01)

(58) Field of Classification Search
CPC .............. G06F 17/30303; G06F 17/30371
USPC ....................................... 707/697
See application file for complete search history.

(56) References Cited

U.S. PATENT DOCUMENTS

| | | | |
|---|---|---|---|
| 6,711,624 B1 * | 3/2004 | Narurkar | G06F 17/30569 707/E17.006 |
| 6,985,926 B1 * | 1/2006 | Ferlauto | G06F 17/30303 707/999.006 |
| 7,836,004 B2 | 11/2010 | Roth et al. | |
| 7,865,507 B2 | 1/2011 | Namait et al. | |
| 8,046,385 B2 | 10/2011 | Wald et al. | |
| 8,108,330 B2 | 1/2012 | Li et al. | |
| 8,126,900 B1 * | 2/2012 | Kostamaa | G06F 17/30569 707/693 |
| 8,949,166 B2 * | 2/2015 | Nelke et al. | 706/47 |
| 2009/0024551 A1 | 1/2009 | Agrawal et al. | |
| 2009/0132950 A1 * | 5/2009 | Gibson | G06F 17/2725 715/780 |
| 2010/0005346 A1 | 1/2010 | Hamlescher et al. | |
| 2011/0137876 A1 | 6/2011 | Yeh et al. | |

(Continued)

OTHER PUBLICATIONS

Alkharboush et al., "A Decision Rule Method for Assessing the Completeness and Consistency of a Data Warehouse", IEEE Inter. Conference on Aug. 31-Sep. 3, 210, pp. 265-268.

(Continued)

*Primary Examiner* — Sheree Brown
(74) *Attorney, Agent, or Firm* — Terry J. Carroll; Edell, Shapiro & Finnan, LLC

(57) ABSTRACT

According to one embodiment of the present invention, a system assesses the quality of column data. The system assigns a pre-defined domain to one or more columns of the data based on a validity condition for the domain, applies the validity condition for the domain assigned to a column to data values in the column to compute a data quality metric for the column, and computes and displays a metric for a group of columns based on the computed data quality metric of at least one column in the group. Embodiments of the present invention further include a method and computer program product for assessing the quality of column data in substantially the same manners described above.

18 Claims, 12 Drawing Sheets

(56) References Cited

U.S. PATENT DOCUMENTS

| | | |
|---|---|---|
| 2011/0138312 A1 | 6/2011 | Yeh et al. |
| 2011/0178971 A1 | 7/2011 | Meeks et al. |
| 2012/0066214 A1 | 3/2012 | Nelke et al. |
| 2012/0123767 A1 | 5/2012 | Ananthanarayanan et al. |
| 2012/0123994 A1 | 5/2012 | Lowry et al. |
| 2012/0158625 A1* | 6/2012 | Nelke .................... G06N 5/025 706/12 |
| 2012/0173724 A1 | 7/2012 | Kache et al. |
| 2013/0006931 A1* | 1/2013 | Nelke ............... G06F 17/30303 707/625 |

OTHER PUBLICATIONS

Almenar et al., "ATLAS Online Data quality Monitoring", 17th IEEE-NPSS Real Time Conference on, May 24-28, 2010, pp. 1-5.

\* cited by examiner

DOMAIN VIOLATIONS

| SOURCE | SCHEMA | TABLE | COLUMN | ROWID | VALUE |
|---|---|---|---|---|---|
| SOURCE1 | SCHEMA1 | TABLE1 | COL1 | 53 | xxyz |
| SOURCE1 | SCHEMA1 | TABLE1 | COL2 | 53 | -1 |
| SOURCE1 | SCHEMA1 | TABLE1 | COL1 | 783 | xxx |
| SOURCE1 | SCHEMA1 | TABLE1 | COL3 | 835 | 1503 |
| SOURCE1 | SCHEMA1 | TABLE1 | COL1 | 1026 | NULL |
| SOURCE1 | SCHEMA1 | TABLE1 | COL2 | 2032 | abcde |
| ⋮ | ⋮ | ⋮ | ⋮ | ⋮ | ⋮ |
| SOURCE2 | SCHEMA2 | TABLE2 | COLA | 684 | NULL |
| SOURCE2 | SCHEMA2 | TABLE2 | COLB | 684 | NULL |
| SOURCE2 | SCHEMA2 | TABLE2 | COLA | 5634 | – |
| ⋮ | ⋮ | ⋮ | ⋮ | ⋮ | ⋮ |

FIG.10

DATA QUALITY ASSESSMENT

BACKGROUND

1. Technical Field

Present invention embodiments relate to assessing data quality, and more specifically, to assessing the completeness and domain validity of column data.

2. Discussion of the Related Art

Assessing the quality of data is an aspect of master data management, data integration, and data migration projects. In such projects, data are typically moved from heterogeneous sources to a consolidated target. Sources may include databases having a large number of data tables, where each table has a number of data columns. Columns may include data that should be identified as having poor quality (e.g., data that do not match expectations of the target system). Existing products for assessing the quality of data can be categorized as tools for data profiling or tools for implementing data rules.

Data profiling tools are designed to provide understanding of data content and to identify potential data quality problems based on a comparison of information about the data with a user's understanding and expectation of what the data should be. Typically, these tools involve a user launching a "column analysis" that will compute statistics (e.g., cardinality, number of null values, frequency distributions, recurring formats, inferred types, etc.) for each column. The user reviews the result of the column analysis and identifies data quality problems based on the user's domain knowledge.

Tools for implementing data rules allow users to define rules describing features of good or bad data. For example, a rule can be an SQL query for all records that do not fulfill an expected condition (e.g., SELECT*FROM CUSTOMER WHERE ID=NULL). Rules can be complex (e.g., based on a relationship between data from separate columns) and portable (e.g., a regular expression). Once a user defines conditions for a rule, the rule can be applied automatically to verify the quality of data.

BRIEF SUMMARY

According to one embodiment of the present invention, a system assesses the quality of column data. The system assigns a pre-defined domain to one or more columns of the data based on a validity condition for the domain, applies the validity condition for the domain assigned to a column to data values in the column to compute a data quality metric for the column, and computes and displays a metric for a group of columns based on the computed data quality metric of at least one column in the group. Embodiments of the present invention further include a method and computer program product for assessing the quality of column data in substantially the same manners described above.

BRIEF DESCRIPTION OF THE SEVERAL VIEWS OF THE DRAWINGS

Generally, like reference numerals in the various figures designate like components.

FIG. 10 illustrates an example table of data values violating a domain validity condition according to an embodiment of the present invention.

DETAILED DESCRIPTION

Figure 1:
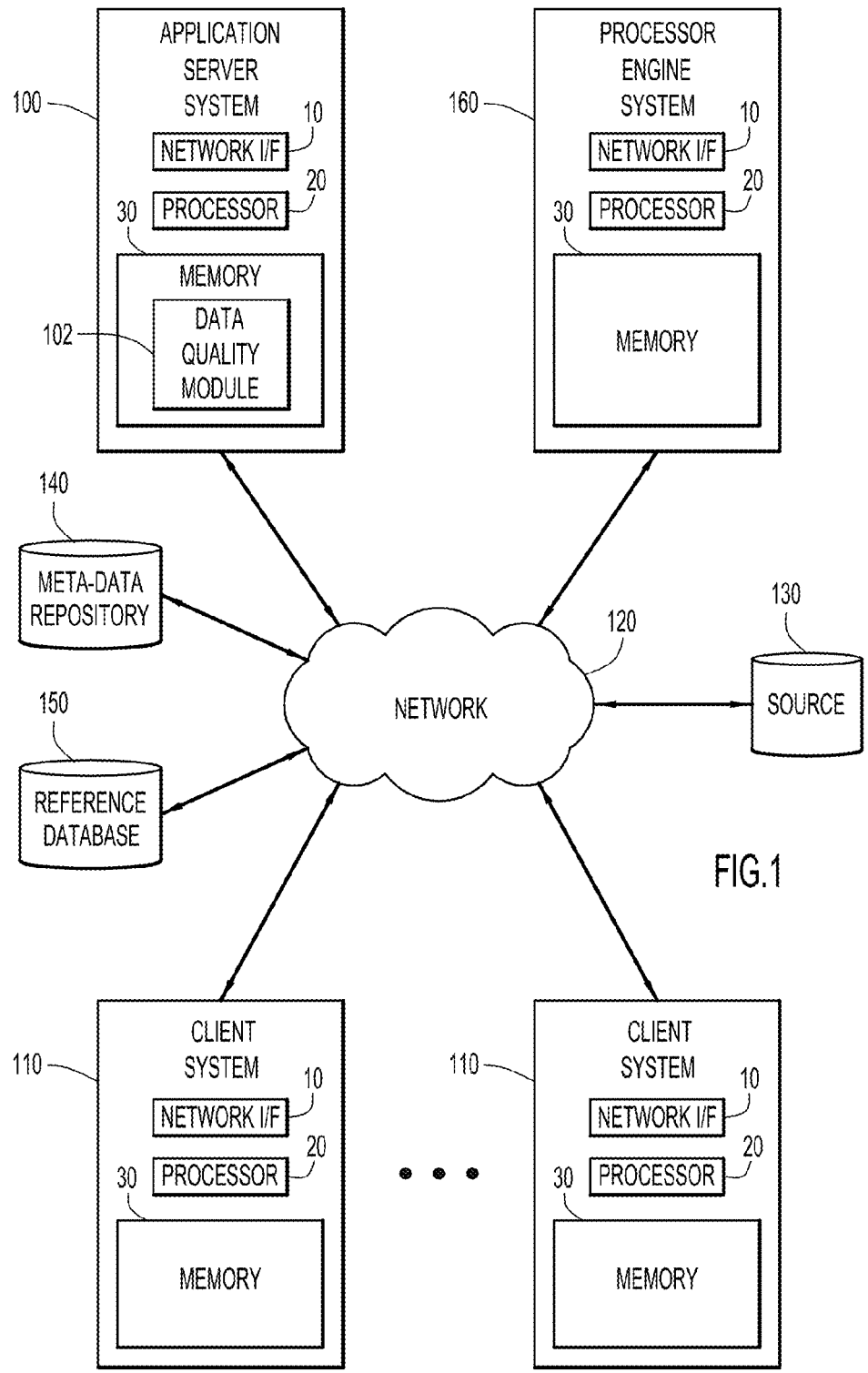
FIG. 1 is a diagrammatic illustration of a computing environment for an embodiment of the present invention.

Present invention embodiments relate to assessing the quality of data in a dataset, and, in particular, to assessing the completeness and/or domain validity of column data.

Assessing domain validity of column data generally relates to finding the number of values in a column of a dataset that satisfy conditions derived from the domain the column represents. For example, if a column contains credit card numbers, all values should match a particular format and checksum used for credit card numbers. If a column contains a ZIP code, all values should be found in a reference table containing all valid ZIP codes. If a column contains prices, all values should be positive and within a certain range, etc.

Assessing completeness generally relates to finding how many values of a column are considered as incomplete. A simple check can be to count the number of null values in the column, but some domains may have other definitions of values that should be considered as incomplete. A completeness check may involve verifying that non-null values are not in a list of values known to be mapped to a missing or incomplete value. For instance "NA", "-", and an empty string may be possible representations of a missing or incomplete value. Other nonobvious representations may be used for specific domains; e.g., "999999" may represent a missing date in a non-nullable column, etc.

A check of domain validity (e.g., the percentage of values not matching the domain conditions) and a check of completeness (e.g., the percentage of values being incomplete) provide the most basic information a user typically needs to see when doing a first assessment of the data quality. However, prior art methods (profiling tools and data rules) of collecting this information can be cumbersome because they force a user to work column by column. Data profiling tools require a user to review each column in turn, looking at frequency distributions or other statistics and defining quality criteria for each column. This process can be time consuming and requires a high level of expertise on the part of the user. Data rules, in contrast, can be executed repeatedly without much expertise once the right rule has been defined and deployed to verify the right columns, but the development time for rules requires both a domain expert and an information technology (IT) expert (e.g., a programmer). The domain expert must be able to formulate correct verification conditions in clear rules and determine which rule should be applied to which column. The IT expert must be able to transcribe those rules into the rule language used by the tool (e.g., SQL or other language). Once the rules are written, they must be tested, debugged, and then deployed to production. Thus the development of rules is similar to software development. It is a time consuming process that requires a high level of expertise and is not suitable for quick assessment of data quality by a non-IT expert.

Furthermore, using existing data rules requires users to review each column individually in order to determine which rules should be applied to which columns.

Neither the profiling nor data rules approach makes efficient use of the tendency for data sources to contain groups of columns that belong to the same domain and for columns belonging to the same domain to share the same quality criteria. One aspect of an embodiment of the present invention is to make use of this observation to simplify and automate initial data quality assessment. In particular, rather than requiring a user to proceed column by column, reviewing profiling results and attaching applicable rules to columns, an embodiment of the present invention defines domains, attaches validity and completeness criteria to the domains, and assigns the domains to the columns.

By attaching the validity and completeness criteria to the domain and the domain to the column, the process of defining precise validity and completeness criteria for all columns of a dataset can be faster and simpler for the user. One reason for this is that large databases almost always have multiple columns from different tables sharing the same domain. Therefore a user only needs to define as many validity and completeness criteria as there are different domains, rather than having to do so for each column.

The process of defining domains and their validity and completeness criteria can be carried out independently of the process of assigning a domain to each column. This is because the domain expertise required for defining domain validity and completeness criteria is often independent of the source of the data being analyzed, while the analysis of the source data can be done by a person who is not a domain expert. For example, the validity criteria for the domain "email address" or "phone number" can be defined by an external domain expert without examining the source data. The process of finding out which columns contain email addresses or phone numbers in a database may require a user to examine the source data, but this user does not necessarily need to know how to define validity criteria for email addresses or phone numbers in order to recognize columns that should be assigned to those domains.

In addition, an embodiment of the present invention may use the validity criteria defined for the domains to automatically detect which columns belong to which domains. For many domains, this may significantly reduce the necessary amount of manual intervention required by the user.

An example illustrates aspects of the contrast between an embodiment of the present invention and the operation of conventional domain rules. In this example, a database contains a large number of columns and tables. More than twenty columns of different tables contain email addresses. Ten of the columns contain ZIP codes, a similar number of columns contain phone numbers, etc.

With the conventional approach, the user has to run column analyses and review each column one by one. At the first column containing an email address, the user has to recognize from the column's values that it contains email addresses, search the internet or ask a domain expert for a good rule (potentially a regular expression) to validate email addresses, and setup a rule or similar procedure to measure how many values in the column do not satisfy the criteria. The next column the user reviews contains ZIP codes. The user has to check if either a list of all valid ZIP codes is available or build this list manually, e.g., by reviewing the frequency distribution of the column and marking each value as being valid or invalid. Then the user has to do something similar for, by way of example, ten other columns belonging to ten different domains. The user may recognize another column as again containing email addresses. The user then has to remember having reviewed a column containing email addresses before. The user will have to find that column again, copy the rule (e.g., a regular expression) defined there, and apply the rule to the new column. By testing the rule against the new column, the user may notice that the rule does not work properly for some values in the new column. The user has to fix the rule and may have to also modify the rule coded for the first column, etc. After a while, all columns may have rules defined and evaluated against them, but changes to a domain may be necessary, and the user may have to find again each column the change impacts and modify the corresponding rules manually one by one. This may be a cumbersome process.

According to an embodiment of the present invention, the different domains and corresponding rules are carefully defined by a domain expert. For example, values of an "email addresses" domain may be validated by a regular expression, "ZIP" codes may be validated by a reference table, "phone numbers" may be validated by another regular expression. The user conducting a data quality assessment runs an automatic analysis. From the values of the data, an embodiment of the present invention automatically detects, in this example, that twenty columns belong to the domain "email address", ten contain "ZIP codes", and ten contains "phone numbers". The user reviews whether the detected domains are correct, potentially completes the classification of some columns manually, and then runs a process to check each column. For each column, the process automatically applies the domain completeness and validity rules and computes a measure of the compliance level for each column, table, schema, and database.

An example computing environment for a present invention embodiment is illustrated in FIG. 1. Specifically, the environment includes application server system 100, one or more client or end-user systems 110, source 130, metadata repository 140, reference database 150, and processing engine 160, each of which may be remote from one another other and communicate over a network 120.

Network 120 may be implemented by any number of any suitable communications media (e.g., wide area network (WAN), local area network (LAN), Internet, intranet, etc.). Alternatively, any number of application server system 100, client systems 110, source 130, metadata repository 140, reference data 150, and processing engine 160 may be local to each other, and communicate via any appropriate local communication medium (e.g., local area network (LAN), hardwire, wireless link, intranet, etc.).

Application server system 100 includes a data quality module 102 to define data quality criteria and analyze data quality metrics. The data quality module may be implemented across plural application server systems. Alternatively, the data quality module may reside on a client system 110 or other computer system (e.g., processing engine 160) in communication with the client system.

Client systems 110 enable users to communicate with the data quality module (e.g., via network 120). The client systems may present any graphical user (e.g., GUI, etc.) or other interface (e.g., command line prompts, menu screens, etc.) to receive commands from users and interact with the data quality module and/or other modules or services.

Processing engine 160 receives and processes data from source 130, metadata repository 140, and reference database 150, applies data quality criteria, and stores data quality metrics and other metadata in metadata repository 140 for analysis by the data quality module.

Application server system 100, client systems 110, and processing engine 160 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., data quality module software). Processing engine 160 can be, e.g., an extract, transform, and load (ETL) engine, a SQL engine, or a distributed engine. Source 130, metadata repository 140, and reference data 150 may be implemented by any conventional or other databases systems or other data storage systems.

The data quality module and processing engine may include one or more modules or units to perform the various functions of present invention embodiments described below (e.g., automatically detecting a domain to which columns belong, applying domain validity and completeness criteria, aggregating validity and completeness statistics, etc.), may be implemented by any combination of any quantity of software and/or hardware modules or units, and may reside within memory 30 of an application server system, processing engine and/or client systems for execution by processor 20.

Figure 2:
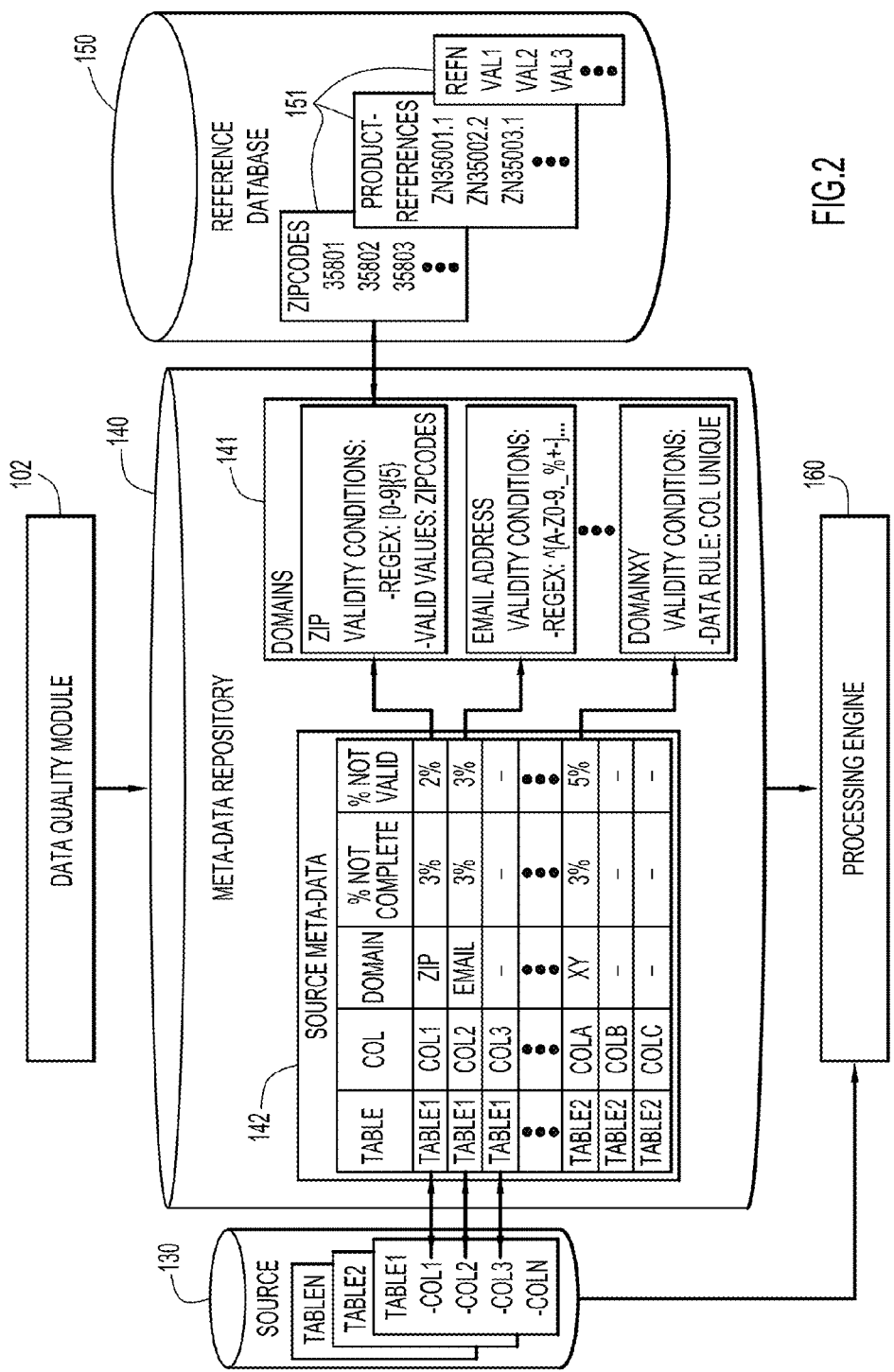
FIG. 2 is a block diagram of a metadata repository, reference database, and source data according to an embodiment of the present invention.

A block diagram of source 130, metadata repository 140, and reference database 150 is illustrated in FIG. 2. The metadata repository holds information about a set of domains 141 and source metadata 142. Each domain can contain one or more domain validity and completeness criteria. The criteria may include regular expressions, rules (e.g., a rule that a column contain no repeated values), a list of valid values, etc., and may refer to a reference table 151 (e.g., containing a list of valid values) which can be stored in reference database 150. Source metadata 142 contains information about the domain and quality of columns from source 130. For example, source metadata 142 may be stored in a table listing the table, name, domain, and validity and completeness statistics for each column of data in source 130. Processing engine 160 receives data from the source, metadata repository, and reference database and analyzes the data to make a preliminary determination of the domain to which each column of the data in the source belongs and to apply the corresponding criteria to each data value and accumulate statistics. The user interacts (e.g., via client system 110 and applications server system 100) with the data quality module, which communicates with the processing engine, metadata repository, and reference database to control this process.

Figure 3:
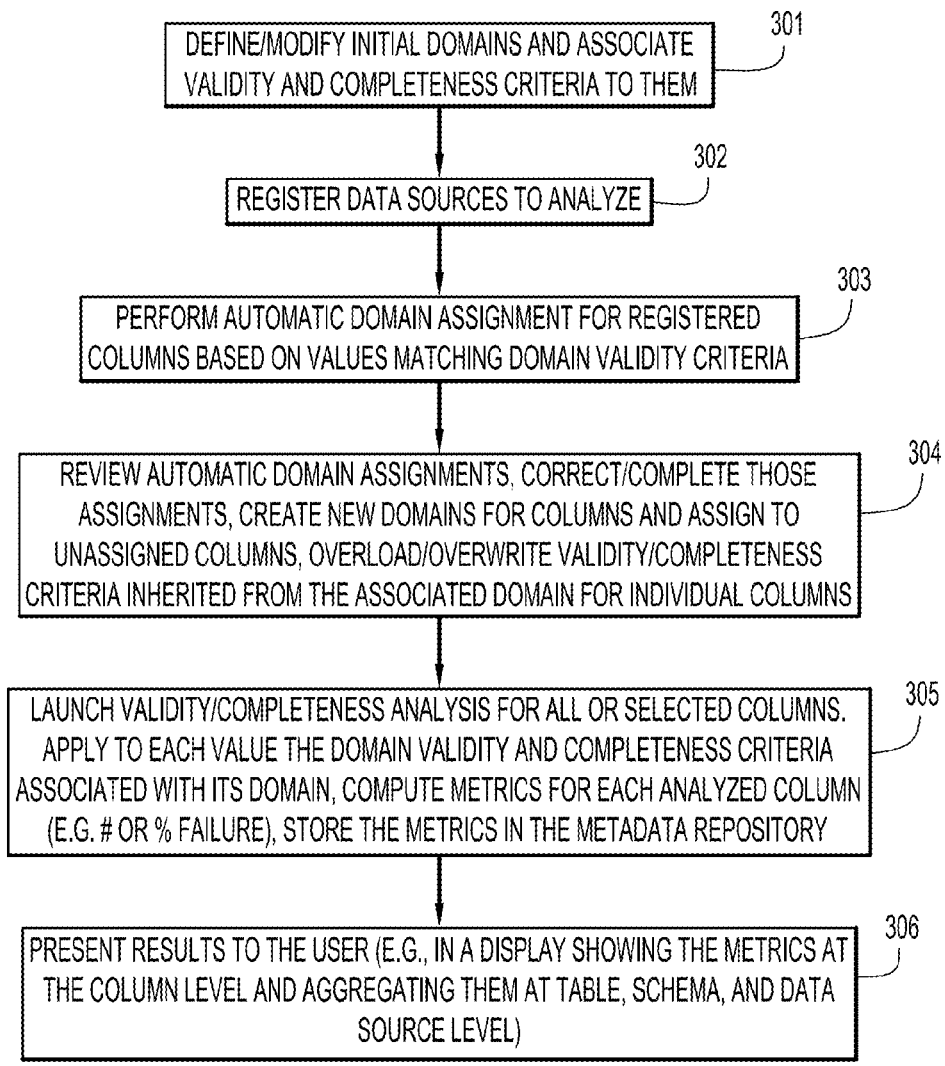
FIG. 3 is a procedural flow chart illustrating an example manner of assessing domain validity and completeness of column data according to an embodiment of the present invention.

A manner in which data quality is assessed (e.g., by data quality module 102 via application server system 100, client system 110, and/or processor engine 160) according to an embodiment of the present invention is illustrated in FIG. 3. At step 301, a user may create or modify an initial set of domains with corresponding validity and completeness criteria. A set of domains (e.g., standard or general purpose domains) may be pre-defined and provided in an embodiment of the present invention.

At step 302, the data to be analyzed are registered with the system, typically by a project administrator. For example, a project administrator may register all or some columns of source 130. The processing engine extracts metadata (e.g., location, table name, column name, etc.) for each registered column and stores the metadata in the source metadata table 142. Typically none of the columns will have been assigned a domain yet, and therefore the domain, completeness, and validity columns of the source metadata table are empty at this stage.

At step 303, columns of the data source are automatically associated with a matching domain from domain set 141. For example, the processing engine can apply the validity criteria of each domain to values from each column in order to determine which domains match which columns. If more than one domain matches a given column, the column can be assigned to the domain for which the highest percentage of values satisfied the validity criteria. Some columns may match none of the defined domains. Details of the matching algorithm are discussed below. The system may be configured to perform this step automatically or when requested by the user.

Once the initial associations of domains to columns has been made, the data quality module presents the results to the user (e.g., via application server system 100 and client system 110) at step 304. The user can review the results, remove incorrect domain assignments, manually assign domains to unclassified columns, and alter validity and/or completeness criteria for individual columns. If necessary the user may create new domain definitions during this process.

At step 305, the user can choose to verify the domain validity and completeness of all the values of a list of selected columns or tables. The processing engine subjects each distinct value of each column to all validity and completeness criteria of the associated domain and counts the number of violations. Data quality metrics (e.g., percentage of each column's values failing the validity criteria, percentage of each column's values failing the completeness criteria, etc.) can be computed from these counts and stored in the metadata repository. The user can review the data quality results in a display showing the data quality at the column, table, schema, and/or source level at step 306.

Figure 4:
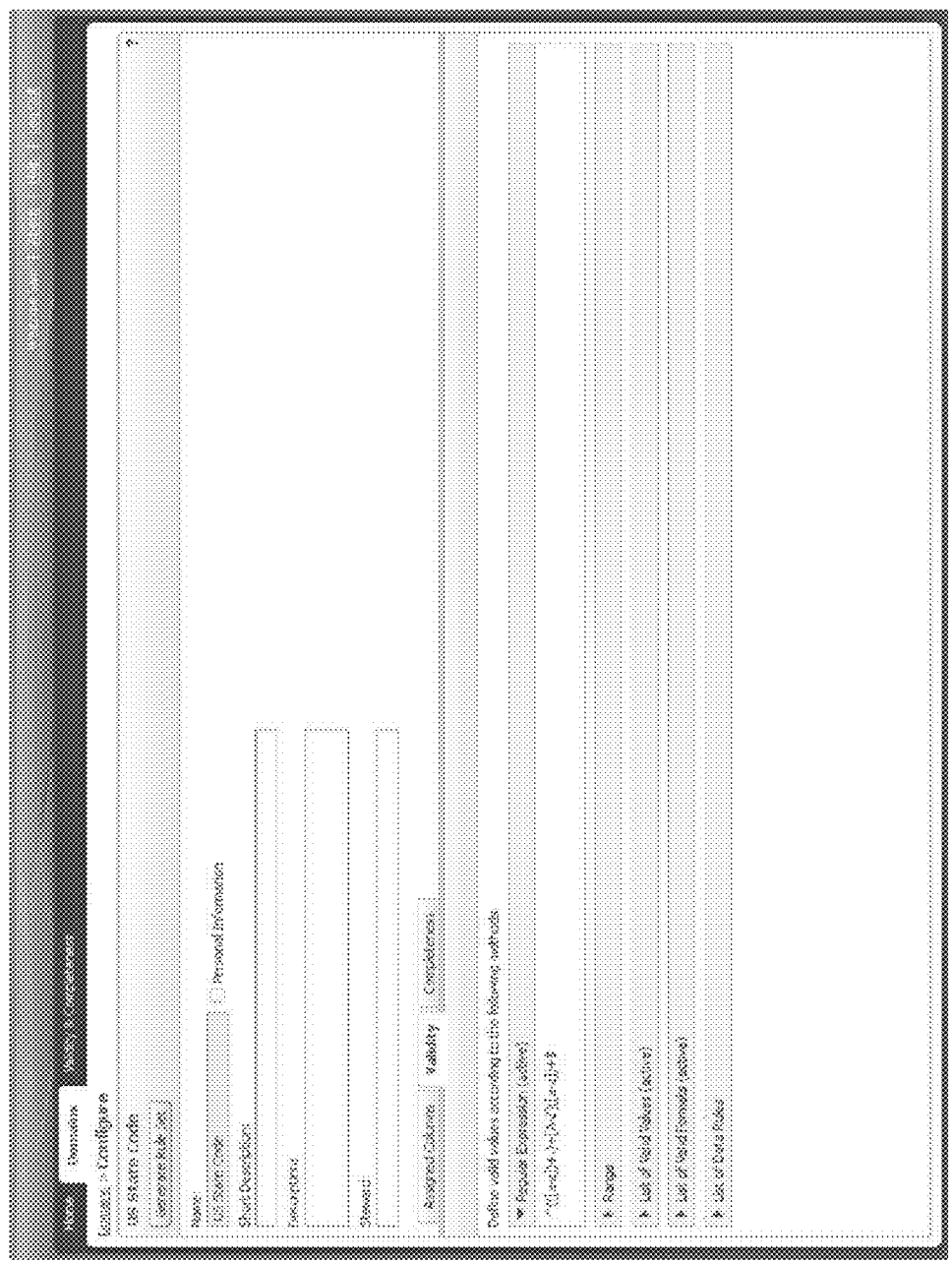
FIG. 4 is a schematic illustration of an example graphical user interface (GUI) for defining domain validity criteria according to an embodiment of the present invention.
Figure 5:
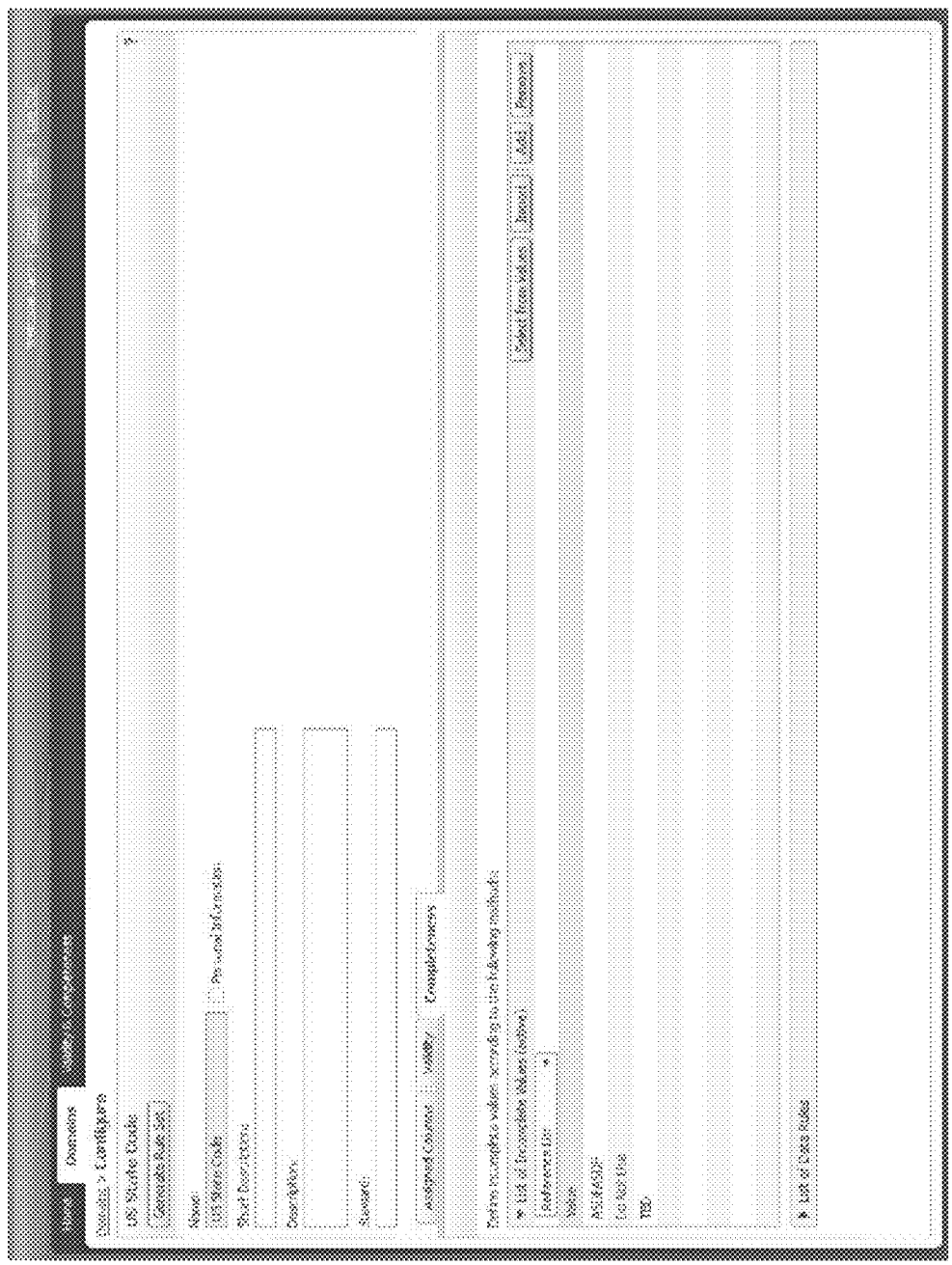
FIG. 5 is a schematic illustration of an example GUI for defining completeness criteria according to an embodiment of the present invention.

FIGS. 4 and 5 illustrate an example manner in which a user supplies metadata that a domain definition may contain according to an embodiment of the present invention. In particular, a GUI allows a user to define or modify the domain's name, description, short description, steward assignment (e.g., the person who defined the domain criteria), and whether the domain contains personal information (e.g., credit card numbers, social security numbers, etc.). Furthermore, the metadata includes a specification of criteria that values must match to be considered valid and complete within this domain. FIG. 4 illustrates a GUI in which the user has selected a tab to enable defining the domain validity criteria. The criteria for domain validity can be defined as one or more of the following:

1. A regular expression that the values must match to be compliant with the domain.

2. A range of values (minimum and maximum) that the values shouldn't exceed.

3. A list of possible valid values, entered, e.g., either directly in the condition if the list is short, or as a reference to an external reference table. If such a list is defined, a value is only considered as valid within the domain if it is found in the reference list of valid values.

4. A list of possible valid formats. Formats are a simpler form of regular expression which are easier for the user to enter. For example, 999AA-AA means values starting with 3 digits followed by 2 uppercase letters, a '-' and 2 other uppercase letters are valid 5. A list of data rules that the column should satisfy. A data rule should only involve one single column. It can be defined in any language and refer to an external rule engine for execution.

FIG. 5 illustrates a GUI in which the user has selected a tab to enable defining criteria that a value must match to be considered as complete within the domain. By way of example, the criteria may include a list of values that are considered as incomplete (e.g., "ASDFASDF", "Do Not Use", "TBD", 99999999, etc.) and a list of data rules. When a value from a data source column is assessed and the value is found in the list of incomplete values, the value will be marked as incomplete. If a list of data rules is specified, a value must satisfy each rule to be considered complete. An example rule, which can also serve as a default validity rule, is that the value not be null.

Figure 6A:
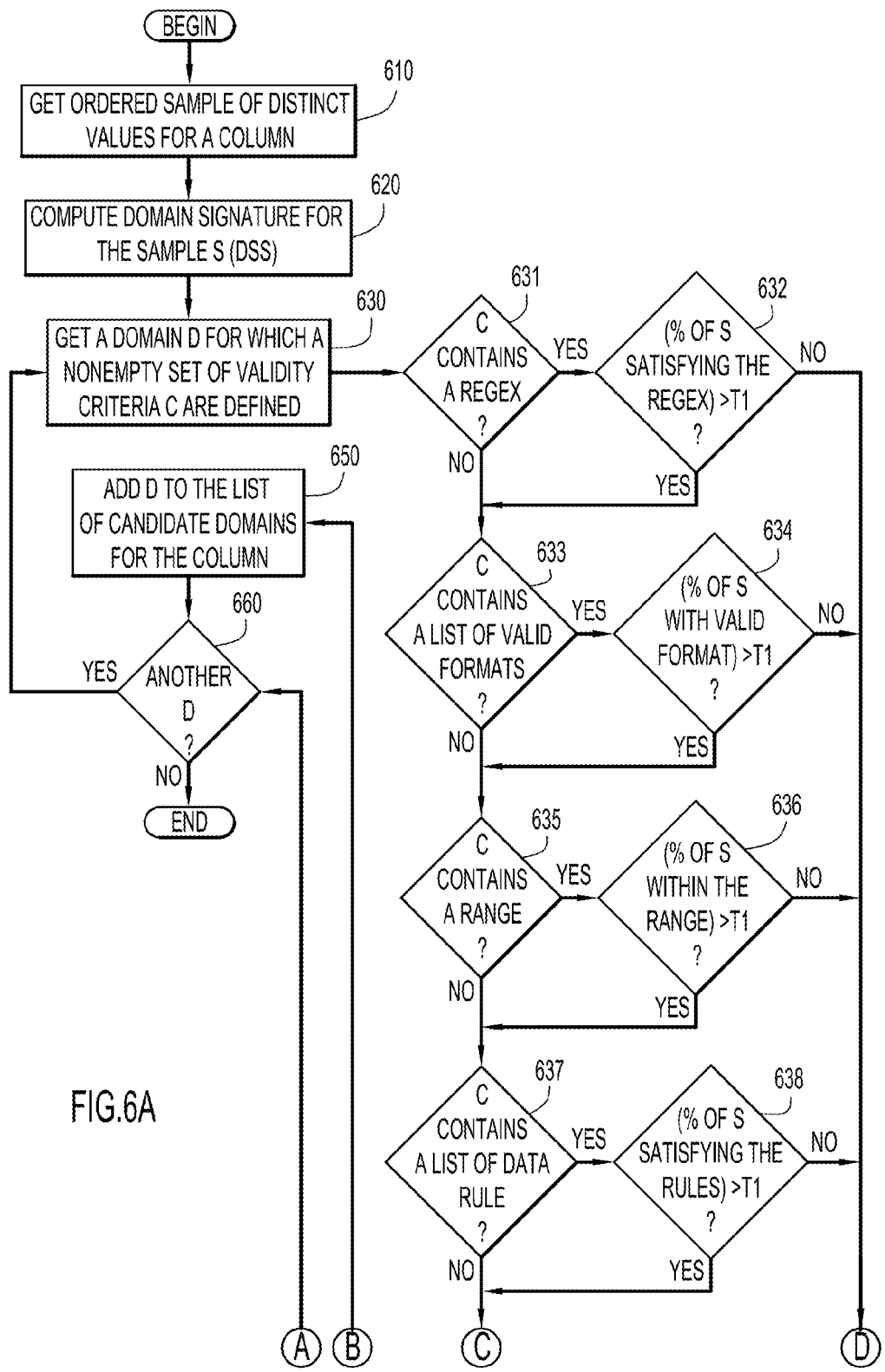
FIGS. 6A and 6B are a procedural flow chart illustrating an example manner of automatically determining a list of domains that match a column based on the validity criteria of the domains according to an embodiment of the present invention.
Figure 6B:
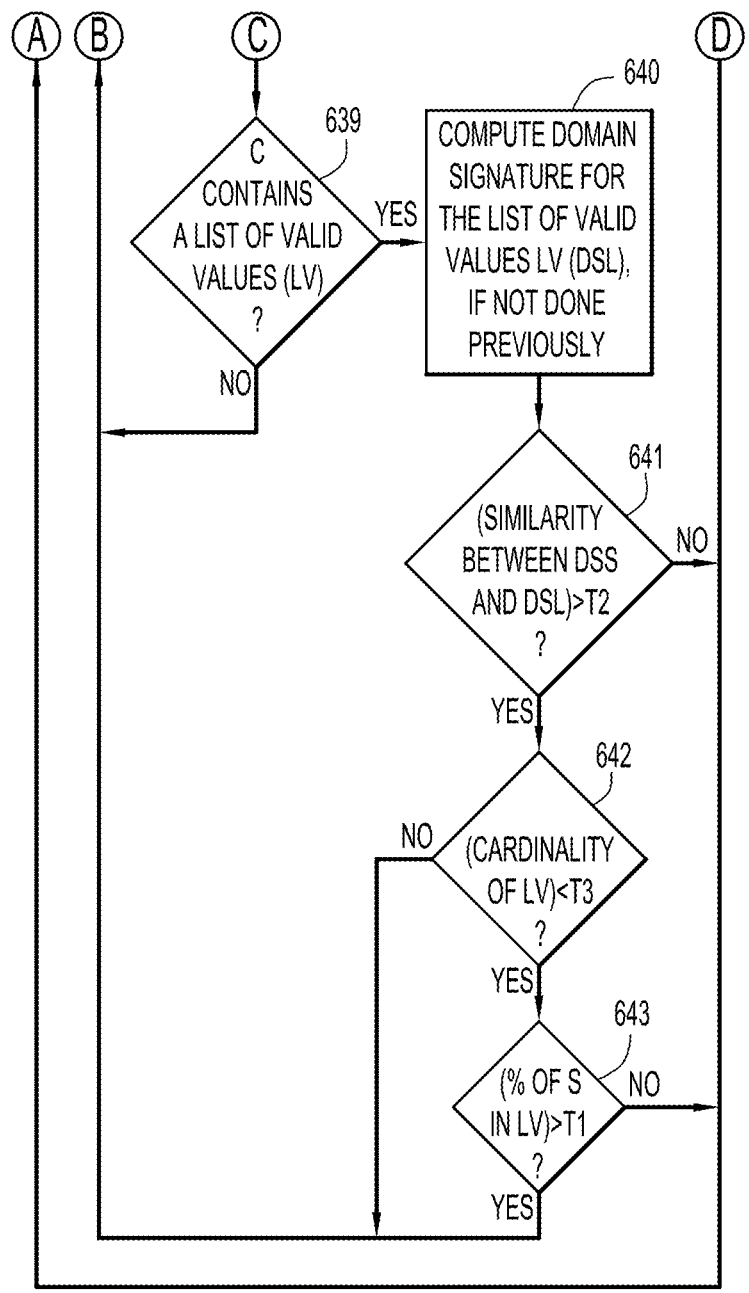

A manner of automatically determining a list of domains that match a column (e.g., via processing engine 160) based on the validity criteria of the domains according to an embodiment of the present invention is illustrated in FIGS. 6A and 6B. Initially, processing engine 160 selects a sample of values from a column to analyze at step 610. The sample may be relatively small compared to the full column so that the analysis can be completed quickly. The values may be required to be distinct, may be associated with corresponding frequencies, and may be sorted in order to optimize comparison against validity criteria (e.g., finding values within a range, determining whether appear in a list of valid values, etc.).

At step 620, a domain signature is computed for the sample. The domain signature of the sample allows a quick comparison to a corresponding signature of another sample of values to estimate a likelihood that the two samples belong to the same domain. For example, the signature can be an approximate frequency distribution of the values in a sample based on the most common values, and the comparison can be based on a chi-squared test for two sample distributions. Any type of test statistic or other measure of similarity may be used to compare signatures (e.g., p-value, chi-squared, likelihood ratio, custom statistic, etc.). Techniques for computing and comparing domain signatures are discussed in U.S. Patent Application Publication No. 2012/0066214, which is incorporated herein by reference.

At step 630, the processing engine begins a loop over each domain for which validity criteria have been defined. In particular, at step 631 the processing engine determines whether the current domain's validity criteria include a regular expression (regex), and, if so, computes at step 632 the percentage of values in the sample that satisfy the regular expression and determines whether the percentage is greater than a predefined threshold T1. If the percentage does not exceed threshold T1, the processing engine determines at step 660 whether another domain remains to be analyzed; if so, processing returns to step 630, otherwise the procedure ends. If the validity criteria do not include a regular expression, or if the percentage of the sample satisfying the regular expression exceeds threshold T1, the processing engine determines whether the validity criteria include a list of valid formats at step 633, and, if so, computes at step 634 the percentage of values that have a valid format. If the percentage does not exceed threshold T1, processing moves to step 660. If the validity criteria do not include a list of valid formats, or if the percentage of the sample having a valid format exceeds threshold T1, the processing engine determines whether the validity criteria include a range at step 635, and, if so, computes at step 636 the percentage of values within the range. If the percentage does not exceed threshold T1, processing moves to step 660. If the validity criteria do not include a range, or if the percentage of the sample within the range exceeds threshold T1, the processing engine determines whether the validity criteria include list of data rules at step 637, and, if so, computes at step 637 the percentage of values within the range. If the percentage does not exceed threshold T1, processing moves to step 660. If the validity criteria do not include a list of data rules, or if the percentage of the sample satisfying the rules exceeds threshold T1, the processing engine determines whether the validity criteria include a list of valid values at step 639. If so, the processing engine computes a domain signature for the list of valid values at step 640, and determines whether the similarity between the domain signature for the list of valid values and the domain signature for the sample values is greater than a threshold T2. If not, processing moves to step 660. Otherwise, the processing engine determines at step 642 whether the cardinality of the list of valid values is less than a threshold T3, and, if so, determines the percentage of the sample values that are in the list. If the percentage is less than threshold T1, processing moves to step 660. If the criteria are determined not to contain a list of valid values at step 639, or if the cardinality of the list of valid values is determined not to be less than threshold T3 at step 642, or if the percentage of values in list is determined to exceed threshold T1 at step 643, then the domain and column match, and the domain is added to a list of candidate domains for the column at step 650. Processing then continues at step 660 as described above.

In other words, the processing engine applies each validity criteria in order of increasing expected computation time, computes the percentage of values in the sample that satisfy that criteria, and continues with the next domain if the percentage does not meet a predefined threshold T1. However, if the domain includes validity criteria based on a reference list of valid values, these criteria are handled slightly differently because checking values against a large reference list can take too long a time. To accelerate the test, the domain signature of the list of valid values is first compared with the domain signature of the data sample of the column. If the similarity between the two domain signatures is not high enough, the domain cannot be a candidate for the column. If the signatures are similar enough, the size of the reference table is checked. If the size is small enough to allow verification that all values of the samples are to be found in the list, the verification is made. If the reference is too large for a quick check, the domain is declared a candidate for the column based only on the similarity of the domain signatures.

Figure 7:
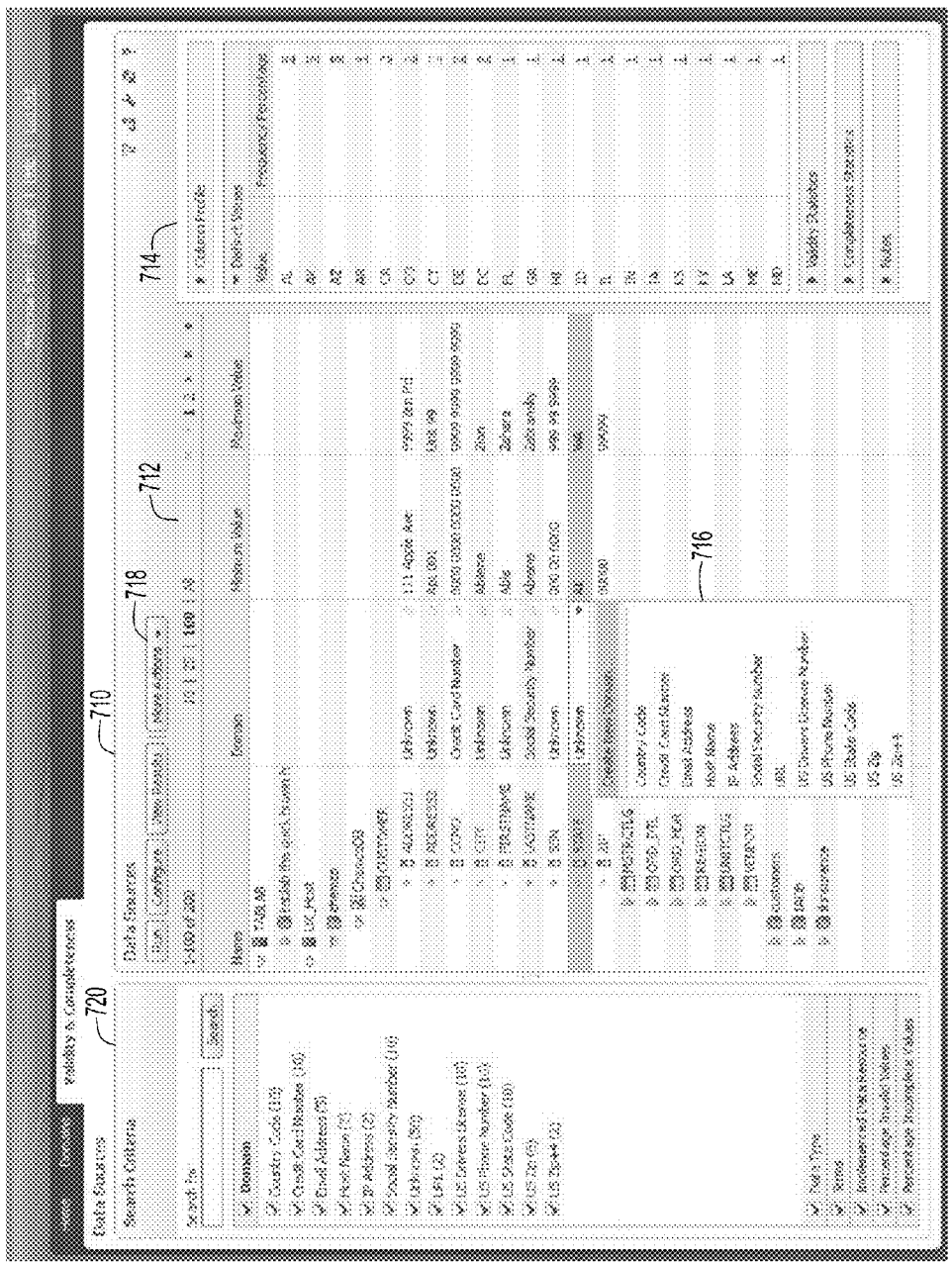
FIG. 7 is a schematic illustration of an example GUI for reviewing domain-column assignments according to an embodiment of the present invention.

FIG. 7 illustrates an example manner in which a user reviews assignments of domains to columns and manually or semi-automatically completes and/or adjusts the assignments according to an embodiment of the present invention.

In particular, a GUI includes a data source browser 710 and a filter panel 720. The column browser includes a hierarchical display 712 showing columns' names, associated domains, and other information organized in a hierarchy according to source, schema, table, and column. The user can select any of the columns from the column browser. A side panel 714 of the column browser contains facet viewers by which the user can view a selected column's profile, distinct values, validity statistics, completeness statistics, and notes. The distinct values facet viewer shows a sample of the values contained in the selected column and their frequency percentage. The user can modify the column's domain classification via a pop-up menu 716. If none of the existing domains correspond to the column (based on the sample of values the user sees and his understanding of the domain), the user can select an option to create a new domain. For example, the user may select the column named STATE from the CUSTOMER table of ChemcoDB schema of the chemco source, see (e.g., in right panel 720) that the column contains values such as "AL", "CA", "DE", "IL", etc., and assign the column to the US State Code domain or create a new domain to assign to the column.

Additionally the system provides the option (e.g., via the More Actions menu 718) to use the computed domain signatures of the columns to find columns that are similar to those associated with a domain. For example, when the user manually associates a domain with a particular column, the system can suggests other columns which are likely to belong to the same domain.

Even if a domain is not explicitly associated to a group of columns, different columns may have similar domain signatures (which are computed during column analysis), indicating a common domain. By creating and assigning a domain to a column with a similar domain signature to one or more other columns, the system can present the option to assign the same domain to the other columns that have a similar domain signature. Another possible option is to let the system automatically make a default assignment to unnamed domains based on the similarity of their domain signature and let the user review and name the domain. For instance, after column analysis the system may find a group of columns (e.g., Col1, Col10, Col11) of different tables which do not match any existing domain yet but have a similar domain signature. The same way another group of columns (e.g., Col2, Col5, Col7) may also have a similar domain signature without a match in the existing domains. Instead of leaving these columns unassigned, the system can create two unnamed domains "Unnamed Domain 1" and "Unnamed Domain 2" and associate the first group of columns to the first unnamed domain and the second group of columns to the second unnamed domain. The system may then be able to suggest domain validity criteria based on the characteristics of the domain signature. The user need only name the domain and review/correct the domain's validity and completeness criteria and the assignments of columns to the domain. This makes the domain assignment process faster by relieving the user of having to discover the column groupings by manual inspection.

Filter panel 720 allows the user to filter the displayed columns (e.g., by domain, data type, terms, implemented data resource, percentage of invalid values, percentage of incomplete values, etc.). A facet viewer within the filter panel allows the user to see, e.g., the domains currently in use and show or hide particular domains to focus on certain columns. Thus the user can easily hide non-interesting columns or find columns with a particular domain or without a domain assignment.

Figure 8:
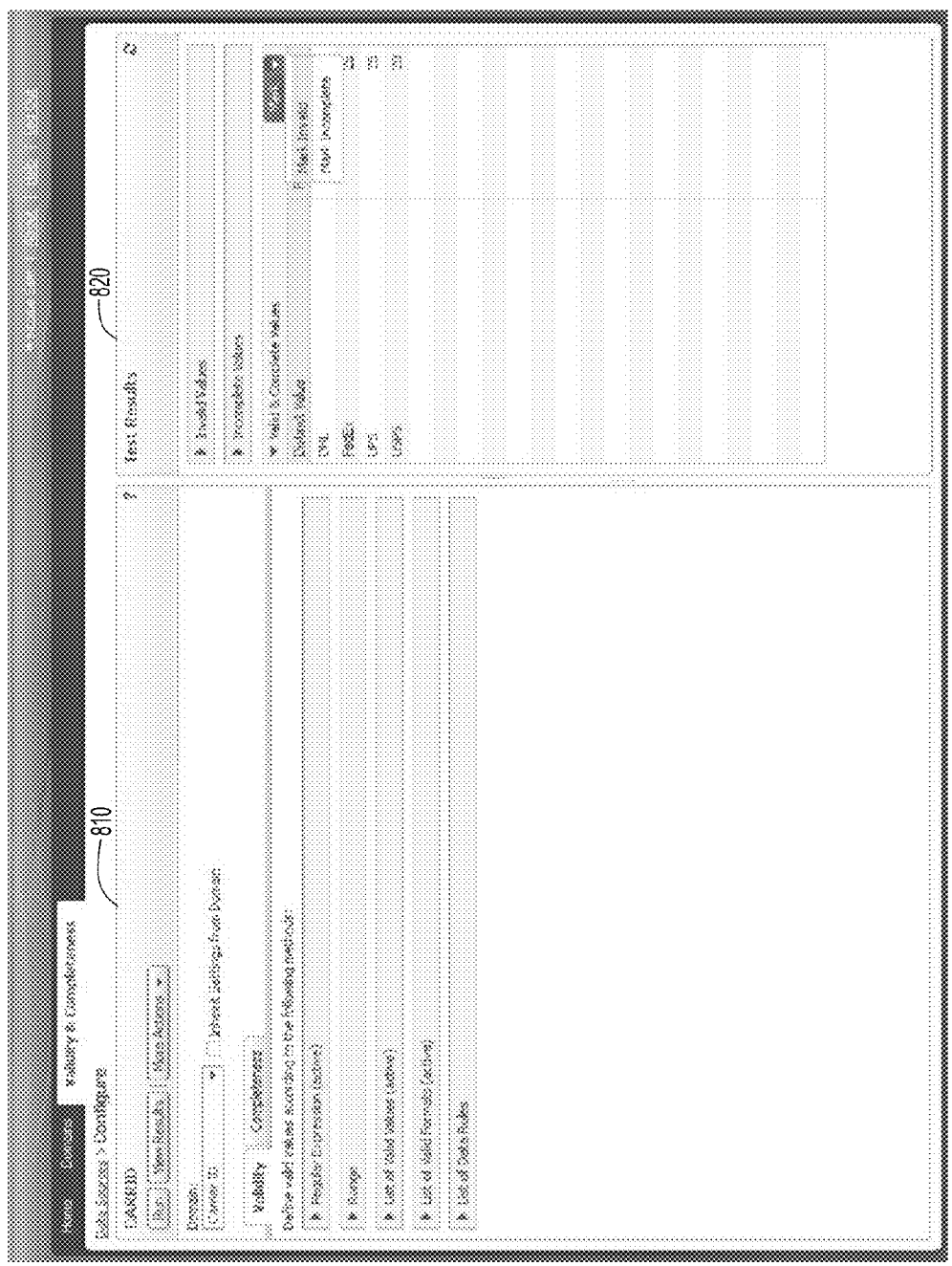
FIG. 8 is a schematic illustration of an example GUI for editing the validity criteria for a column according to an embodiment of the present invention.

An example manner in which a user may edit the validity or completeness criteria for a column according to an embodiment of the present invention is illustrated in FIG. 8. In particular, a GUI includes a configuration panel 810 and a results panel 820. The configuration panel allows the user to select a domain to be associated with a selected column (e.g., a column selected from hierarchical display 712 (FIG. 7) and to create or edit the domain's validity and completeness criteria. The results panel contains facet viewers for invalid values of the selected column, incomplete values, and values that are valid and complete. In an example scenario, a user reviews a column for which no domain was found by the system. From the values of the column (e.g., DHL, FedEx, UPS, USPS), the user recognizes the domain to which the column should belong (carriers, in this example). The user defines a new domain (named, e.g., Carrier ID) for the column. The system attaches the new domain to the column the user is reviewing. Other columns may also be attached to the new domain (e.g., manually, or automatically based on similar domain signatures).

Defining the right validity criteria from scratch is not always an easy task. Often the user needs to look at many examples to be sure special cases are covered by the criteria. Thus the GUI aids the user in defining appropriate validity criteria by providing the user good examples of values belonging to the domain, namely values from the column under review. The values in the current column serve as test data for developing criteria for the domain.

The user can enter validity and/or completeness criteria (e.g., regular expressions, valid values, valid formats, rules, etc.) in configuration panel 810. Each time criteria are entered the system re-determines the values of the column which are classified as valid, invalid, and incomplete. This provides the user immediate feedback about whether the rules properly cover all values, thereby facilitating the rule development process. When a user first creates a new domain, all values in the column are classified as valid. The user then enters, for instance, a first regular expression and may observe values moving from "valid" to "incomplete" or "invalid". In reviewing the list of valid values, the user may see some values that should not be considered as valid. The user can modify the regular expression or other conditions and see if the value is reclassified as invalid or incomplete.

Alternatively, the user can directly mark the value as being invalid and/or incomplete. In that case the system will automatically create if necessary a list of reference values marked incomplete and/or invalid (the list may reside in memory if the list is short; the list may be converted automatically to persisted reference columns when its number of values exceeds a predetermined threshold) and add the marked invalid/incomplete values to the list (alternatively the system uses separate lists for invalid reference values and incomplete reference values). Thus the user can conveniently edit reference values and validity/completeness criteria of a domain while looking at a particular column and have immediate feedback of the result of the criteria.

The same mechanism can be used to complete the validity criteria of an existing domain. If the user notices that the domain validity criteria that had been created for a first column does not properly cover all values of a second column belonging to the same domain, the user can use the same mechanism to extend the existing rules/values of the domain until all values of the second column are covered properly. The user can decide to have the altered criteria apply only to the selected column, overloading or overwriting the criteria defined in the associated domain. In that case no other column associated with the same domain would be affected by the change to the domain's criteria. Alternatively, the user can choose to apply the altered criteria to the existing domain itself, so that all columns sharing the same domain will be validated against the updated criteria.

Thus the user can develop and evolve the domain definitions as more columns belonging to the same domain are reviewed, without having to apply changes to columns which have already been reviewed, making the process more efficient than conventional approaches.

Once all columns to validate are assigned to a domain having validity and completeness criteria, the user can select (e.g., via hierarchical display 712 (FIG. 7)) a group of columns, tables, schema or sources to validate and cause the system to run the validation against all values in the selected group.

Figure 9:
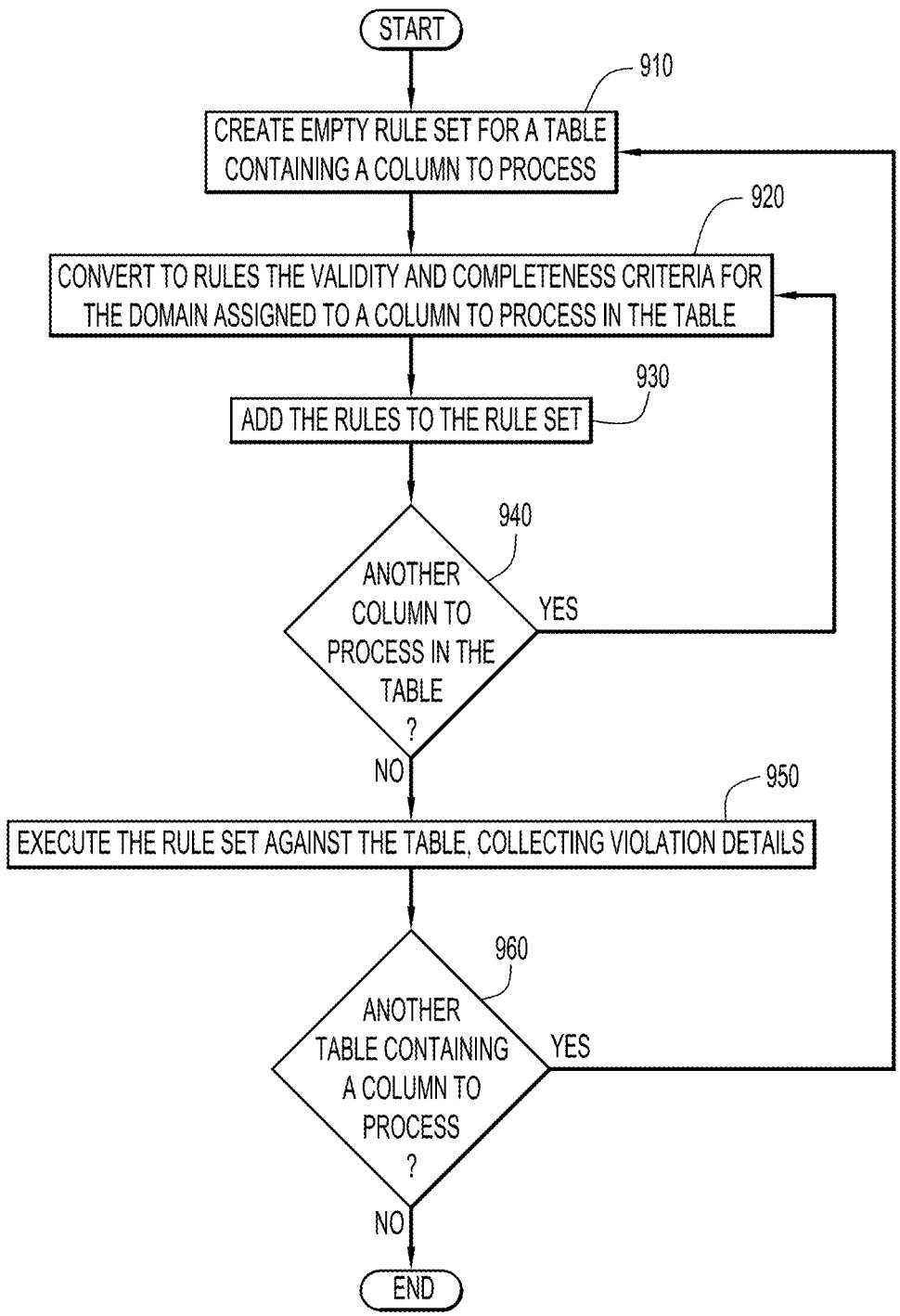
FIG. 9 is a procedural flow chart illustrating an example manner of applying validity and completeness criteria to data columns according to an embodiment of the present invention.

A manner of applying validity and completeness criteria against a data source (e.g., via processing engine 160) according to an embodiment of the present invention is illustrated in FIG. 9. For each table containing a column to be analyzed, the processing engine creates an empty rule set at step 910. For each column to be analyzed in the current table, the processing engine converts at step 920 the validity and completeness criteria of the domain assigned to the column to rules, and adds the rules to the rule set at step 930. At step 940, the processing engine determines whether there is another column to be analyzed in the current table. If so, the procedure returns to step 920. Otherwise, the processing engine executes the rules set against the table and collects details of the violations. At step 960, the processing engine determines whether there is another table containing columns to be analyzed. If so, the procedure returns to step 910. Otherwise, the procedure ends. To maximize performance, the procedure does not execute the validity/completeness tests of each columns individually (as in conventional approaches). Rather a rule set is built for all conditions of each column of a table. Each table results in a single analysis job covering all the tests that apply to columns of the table. As a result, a single pass over the data of each table is performed, which is more efficient than performing multiple queries for each column.

The results of applying the validity and completeness criteria include details about which rows of a table violate which domain validity or completeness criteria of which column. An example table containing results of the analysis is illustrated in FIG. 10. In particular, the table includes columns for the source, schema, table, column, row, and value of data violating the domain criteria. By way of example, the 53rd row of Table1 of Schema1 of Source1 violates the domain validity criteria of Col1 (where the value is xxyz) and the domain of validity of Col2 (where the value is −1). Storing the results in such a table facilitates computation of aggregate quality metrics at column, table, and schema source levels. For example, the queries of the following forms can be used to aggregate results for domain violations at the column, table, and schema levels respectively:

SELECT DISTINCT COUNT(RowID) FROM "Domain Violations" WHERE Source="Source1" AND Schema="Schema1" AND Table="Table1" AND Column="Col1"

SELECT DISTINCT COUNT(RowID) FROM "Domain Violations" WHERE Source="Source1" AND Schema="Schema1" AND Table="Table1"

SELECT DISTINCT COUNT(RowID) FROM "Domain Violations" WHERE Source="Source1" AND Schema="Schema1"

Figure 11:
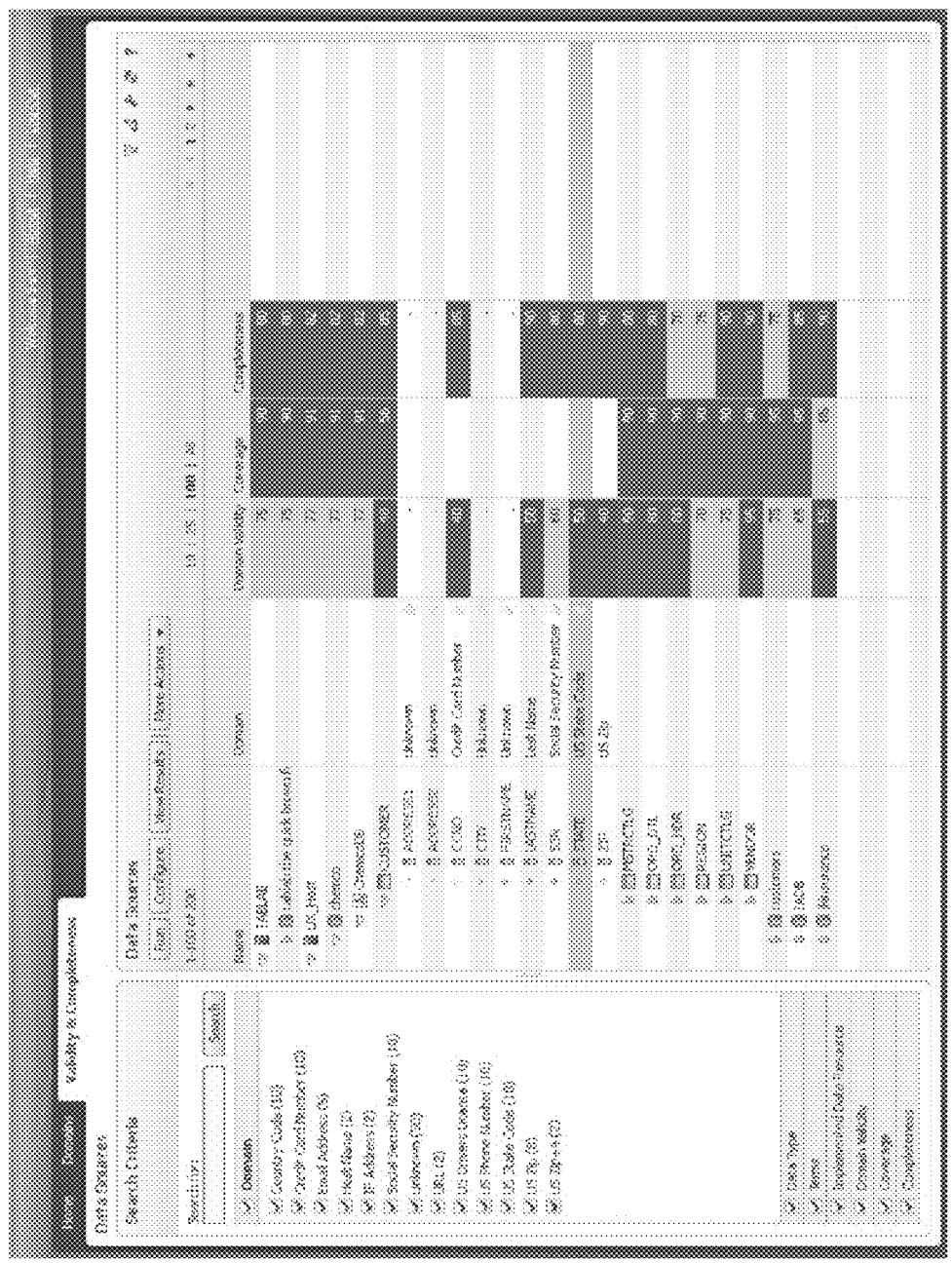
FIG. 11 is a schematic illustration of an example GUI for viewing data quality results according to an embodiment of the present invention.

FIG. 11 is a schematic illustration of an example GUI for viewing data quality results according to an embodiment of the present invention. In particular, a display similar to that illustrated in FIG. 7 is populated with data quality metrics. The display shows all sources, schemas, tables, and columns organized in as a hierarchy and shows corresponding percentages of domain validity compliance, domain completeness compliance, and coverage. The percentage of coverage represents the percentage of columns in a table, schema or source that are associated with validity and completeness criteria (e.g., via a domain assignment). This information is important for the user to understand the relevance of the results. For example, a table of the source data may have few domain validity or completeness violations not because it contains mostly good quality data but because only a small fraction its tables are associated with domain validity criteria.

It will be appreciated that the embodiments described above and illustrated in the drawings represent only a few of the many ways of implementing embodiments for assessing the domain validity and completeness of column data.

The topology or environment of the present invention embodiments may include any number of computer or other processing systems (e.g., client or end-user systems, application server systems, processing engines, etc.) databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., data quality module software, processing engine software, database software, communications software, application server software, etc.). These systems may include any types of monitors and input devices (e.g., keyboard, mouse, voice recognition, touch screen, etc.) to enter and/or view information.

It is to be understood that the software (e.g., data quality module software, processing engine software, database software, communications software, application server software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and application server systems, processing engine and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., e.g., data quality module software, processing engine software, database software, communications software, application server software, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other data storage systems (e.g., databases, files, arrays, data structures, etc.) to store information (e.g., source data, metadata, reference tables, results, etc.). The database systems may be implemented by any number of any conventional or other databases, data stores or storage structures (e.g., files, databases, data structures, data or other repositories, etc.) to store information (e.g, source data, metadata, reference data). Source 130, metadata repository 140, and reference database 150 may be included within or coupled to the server and/or client systems.

Present invention embodiments may be used to assess the quality of any quantity of columns containing data of any type (e.g., integer data, floating point data, categorical data, text, etc.) stored in any format or system (e.g., database, text files, binary files, web pages, etc.) representing any type of information (e.g., commercial data, scientific data, reference materials, etc.). A column may be of any type or form (e.g., columns of a database table; spreadsheet; array; variable or field of a class, form, cell, or other data structure, etc.).

The present invention embodiments may employ any number of any type of user interface (e.g., Graphical User Interface (GUI), command-line, prompt, etc.) for obtaining or providing information (e.g., defining or modifying validity or completeness criteria for a domain, registering data sources, viewing or modifying assignments of domains to columns, launching validity and/or completeness analyses, displaying validity and/or completeness results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks, algorithms, or network/environment described above, but may be utilized for assessing the quality of any data. Present invention embodiments may use any types of criteria for the validity and completeness of column data; any algorithms and formulas for matching domains and columns; and metrics for completeness or domain validity of a column (e.g., number, percentage, fraction, etc. of values in the column that satisfy the completeness and/or domain validity conditions; number, percentage, fraction, etc. of values in the column that do not satisfy the completeness and/or domain validity conditions; etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for assessing the quality of data comprising:
   at least one processor and a metadata repository, wherein the at least one processor is configured to:
   apply a set of validity conditions for each of a plurality of pre-defined domains in the metadata repository to each of a plurality of columns of the data, wherein at least one pre-defined domain is associated with a plurality of rules specifying the set of validity conditions for data of that at least one pre-defined domain;
   assign pre-defined domains selected from among the plurality of pre-defined domains to corresponding columns of the data based on satisfaction of the set of validity conditions for the pre-defined domains, wherein each of at least two of the columns of the data remains unassigned to a corresponding domain;
   generate a group of two or more of the unassigned columns based on characteristics of the unassigned columns;
   create a new domain for the group of unassigned columns with a corresponding set of validity conditions and assign the columns of the group to the new domain;
   apply the set of validity conditions for the domain assigned to a column to data values in the column to compute a data quality metric for the column; and
   display a metric for one or more sets of columns that is computed based on the computed data quality metric of at least one column in each set of columns.

2. The system of claim 1, wherein the set of validity conditions of each domain assigned to a column of the data includes at least one of a list of valid values, a list of invalid values, a regular expression, a list of valid formats, a list of invalid formats, and a list of data rules that operate on values within a single column.

3. The system of claim 1, wherein the at least one processor is further configured to:
   compute a signature for each of a plurality of columns;
   assign two or more of the unassigned columns with similar computed signatures to the new domain, wherein the set of validity conditions for the new domain is based on characteristics of the signatures of the columns assigned to the new domain.

4. The system of claim 3, wherein the at least one processor is further configured to:
  name the new domain; and
  generate the set of validity conditions for the new domain by modifying validity criteria based on the characteristics of the signatures and defining a validity condition for the new domain.

5. The system of claim 1, wherein the at least one processor is further configured to:
  display values of a data column with indicia of which values comply with an original validity condition;
  update the display in response to a modification to the original validity condition;
  modify a validity condition to include a value in a list of invalid values in response to receiving an indication that the value is invalid; and
  assign the modified validity condition to a domain associated with the column.

6. The system of claim 1, wherein
  the one or more sets of columns comprise tables and databases;
  the metric for one or more sets of columns comprises:
    a measure of the number of values of a column not matching the set of validity conditions for the domain assigned to the column,
    a table metric, where the table metric is a measure of the number of rows of a table having at least one value in a column that does not match the set of validity conditions for the domain assigned to the column,
    a sum or average of table metrics for a group of tables, and
    a measure of the number of columns of a set of columns for which a domain having a set of validity conditions is defined; and
  displaying a metric comprises displaying a visual cue indicating that the metric satisfies a pre-determined threshold.

7. A computer program product for assessing data quality comprising:
  a computer readable storage device having computer readable program code embodied therewith for execution on a first processing system, the computer readable program code comprising computer readable program code configured to:
    apply a set of validity conditions for each of a plurality of pre-defined domains to each of a plurality of columns of the data, wherein at least one pre-defined domain is associated with a plurality of rules specifying the set of validity conditions for data of that at least one pre-defined domain;
    assign pre-defined domains selected from among the plurality of pre-defined domains to corresponding columns of the data based on satisfaction of the set of validity conditions for the pre-defined domains, wherein each of at least two of the columns of the data remains unassigned to a corresponding domain;
    generate a group of two or more of the unassigned columns based on characteristics of the unassigned columns;
    create a new domain for the group of unassigned columns with a corresponding set of validity conditions and assign the columns of the group to the new domain;
    apply the set of validity conditions for the domain assigned to a column to data values in the column to compute a data quality metric for the column; and
    display a metric for one or more sets of columns that is computed based on the computed data quality metric of at least one column in each set of columns.

8. The computer program product of claim 7, wherein the set of validity conditions of each domain assigned to a column of the data includes at least one of a list of valid values, a list of invalid values, a regular expression, a list of valid formats, a list of invalid formats, and a list of data rules that operate on values within a single column.

9. The computer program product of claim 7, wherein the computer readable program code is further configured to:
  compute a signature for each of a plurality of columns;
  assign two or more of the unassigned columns with similar computed signatures to the new domain, wherein the set of validity conditions for the new domain is based on characteristics of the signatures of the columns assigned to the new domain.

10. The computer program product of claim 9, wherein the computer readable program code is further configured to:
  name the new domain; and
  generate the set of validity conditions for the new domain by modifying validity criteria based on the characteristics of the signatures and defining a validity condition for the new domain.

11. The computer program product of claim 7, wherein the computer readable program code is further configured to:
  display values of a data column with indicia of which values comply with an original validity condition;
  update the display in response to a modification to the original validity condition;
  modify a validity condition to include a value in a list of invalid values in response to receiving an indication that the value is invalid; and
  assign the modified validity condition to a domain associated with the column.

12. The computer program product of claim 7, wherein
  the one or more sets of columns comprise tables and databases;
  the metric for one or more sets of columns comprises:
    a measure of the number of values of a column not matching the set of validity conditions for the domain assigned to the column,
    a table metric, where the table metric is a measure of the number of rows of a table having at least one value in a column that does not match the set of validity conditions for the domain assigned to the column,
    a sum or average of table metrics for a group of tables, and
    a measure of the number of columns of a set of columns for which a domain having a validity condition is defined; and
  displaying a metric comprises displaying a visual cue indicating that the metric satisfies a pre-determined threshold.

13. The computer program product of claim 7, wherein the computer readable program code is further configured to:
  combine the set of validity conditions for a plurality of columns of a table to form a rule set, and apply the rule set to the plurality of columns in a single pass over the table.

14. The computer program product of claim 7, wherein the set of validity conditions for a pre-defined domain comprises a completeness condition to identify missing column values.

15. The computer program product of claim 8, wherein the set of validity conditions for a pre-defined domain comprises a plurality of criteria, and assigning the pre-defined domain to one or more columns comprises:
  selecting a sample of values from each of the one or more columns;
  computing a signature for each selected sample; and
  applying a second of the validity criteria to a selected sample of values only if the number of values of the selected sample satisfying a first of the validity criteria exceeds a pre-determined threshold.

16. The system of claim 1, wherein the at least one processor is further configured to:
  combine the set of validity conditions for a plurality of columns of a table to form a rule set, and apply the rule set to the plurality of columns in a single pass over the table.

17. The system of claim 1, wherein the set of validity conditions for a pre-defined domain comprises a completeness condition to identify missing column values.

18. The system of claim 2, wherein the set of validity conditions for a pre-defined domain comprises a plurality of criteria, and assigning the pre-defined domain to one or more columns comprises:
  selecting a sample of values from each of the one or more columns;
  computing a signature for each selected sample; and
  applying a second of the validity criteria to a selected sample of values only if the number of values of the selected sample satisfying a first of the validity criteria exceeds a pre-determined threshold.

* * * * *